(12) United States Patent
de Koning

(10) Patent No.: US 7,134,833 B2
(45) Date of Patent: Nov. 14, 2006

(54) SERVO ADJUSTABLE GRIPPER DEVICE

(75) Inventor: Johannes J. M. de Koning, Glen Allen, VA (US)

(73) Assignee: Flexicell, Inc., Ashland, VA (US)

( * ) Notice: Subject to any disclaimer, the term of this patent is extended or adjusted under 35 U.S.C. 154(b) by 148 days.

(21) Appl. No.: 10/910,703

(22) Filed: Aug. 3, 2004

(65) Prior Publication Data

US 2006/0045721 A1  Mar. 2, 2006

(51) Int. Cl.
*B25J 15/00* (2006.01)

(52) U.S. Cl. ............................... 414/753.1; 198/468.3; 294/65; 414/752.1; 901/40; 901/31

(58) Field of Classification Search ............. 414/751.1, 414/752.1, 753.1, 737, 739; 294/65, 2; 198/468.3, 198/474.1; 901/40, 31
See application file for complete search history.

(56) References Cited

U.S. PATENT DOCUMENTS

| | | | | |
|---|---|---|---|---|
| 5,088,878 | A | * | 2/1992 | Focke et al. ................. 414/627 |
| 5,839,769 | A | * | 11/1998 | Slocum et al. ............. 294/87.1 |
| 5,943,842 | A | | 8/1999 | de Koning |
| 2003/0234157 | A1 | | 12/2003 | de Koning |

* cited by examiner

*Primary Examiner*—Donald Underwood
(74) *Attorney, Agent, or Firm*—Lawrence E. Laubscher, Jr.

(57) ABSTRACT

A servo adjustable gripper device for gripping and transporting at least two objects such as boxes includes a frame and at least two gripper assemblies connected with carriages slidably connected with the frame. The gripper device further includes a robotic arm which controls further movement and placement of the boxes on a pallet. The position of the gripper assemblies on the frame is adjustable to provide equal lifting force for a variety of differently sized boxes or for different numbers of boxes.

10 Claims, 8 Drawing Sheets

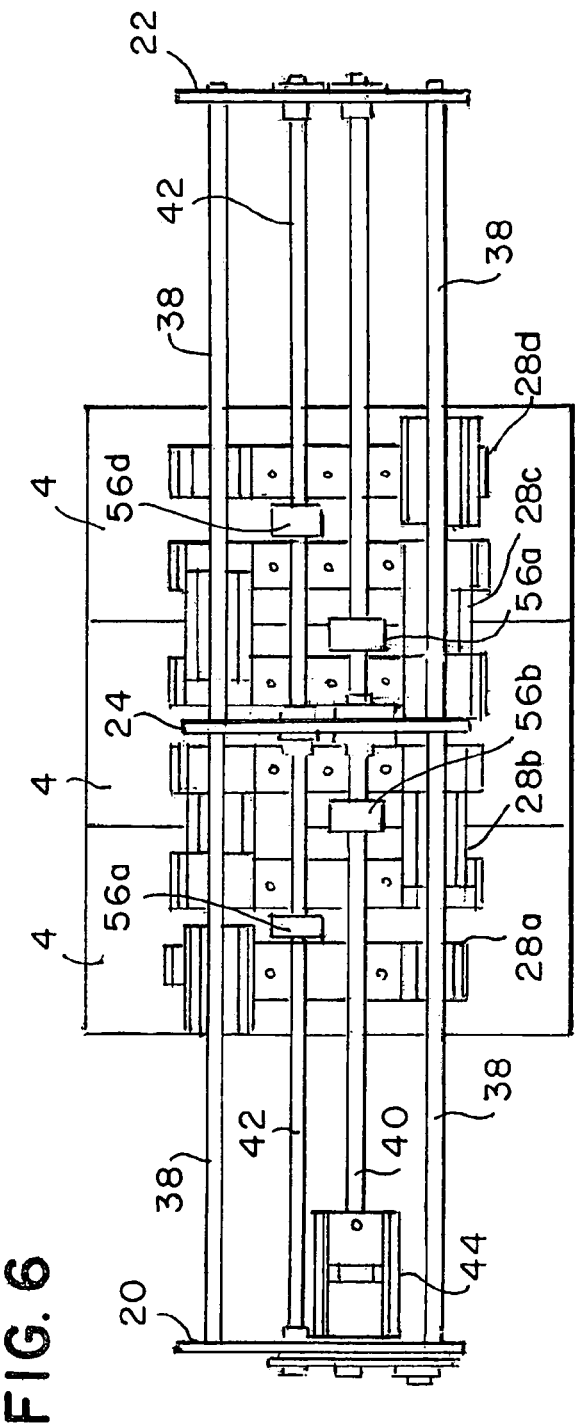
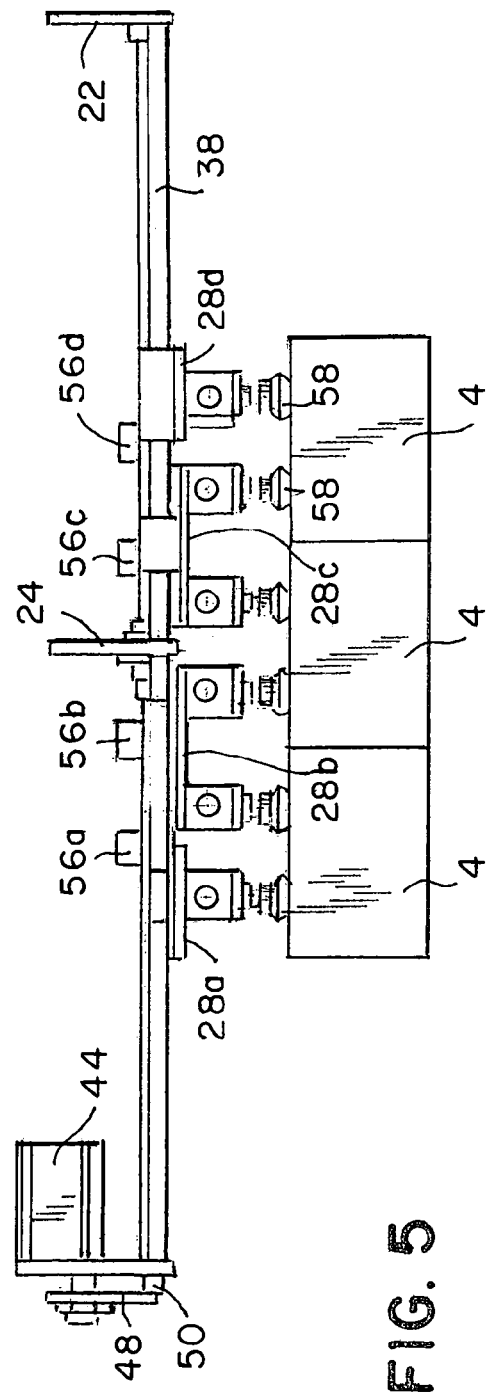
FIG. 6
FIG. 5

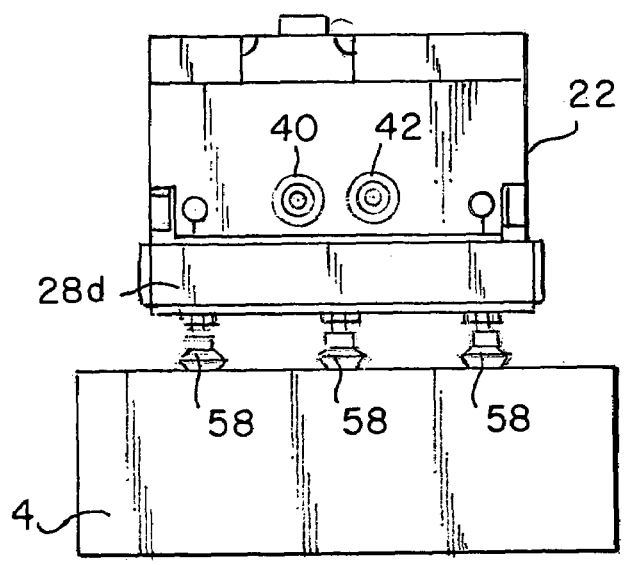
FIG. 8
FIG. 16
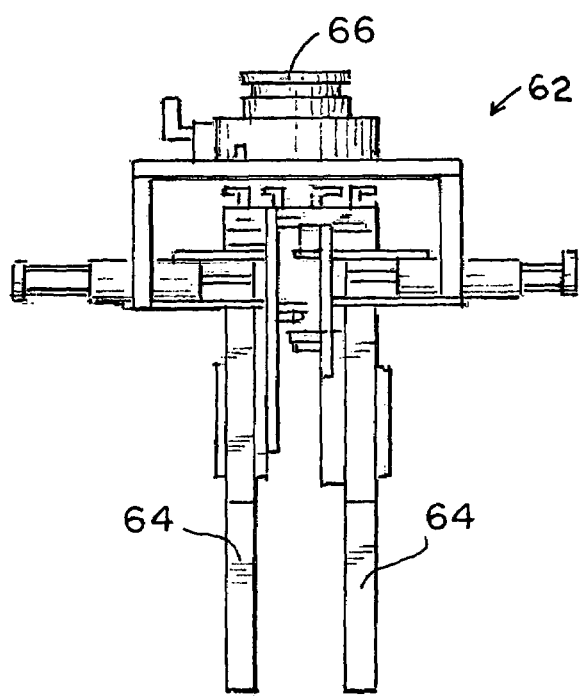

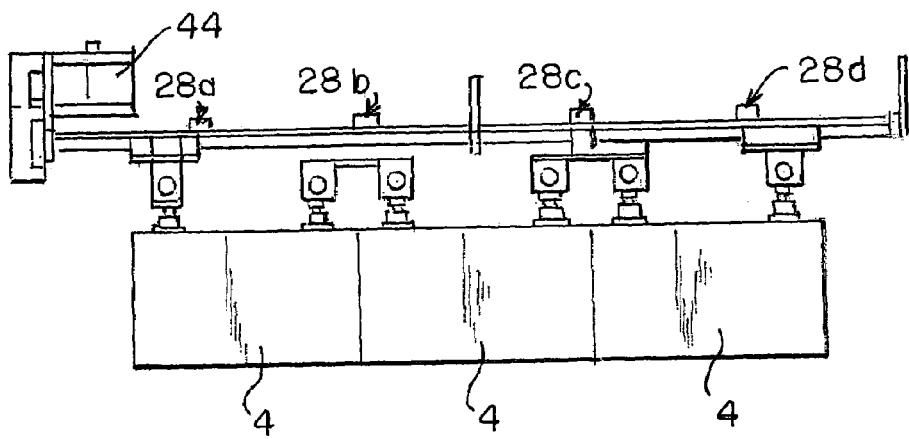
FIG. 9
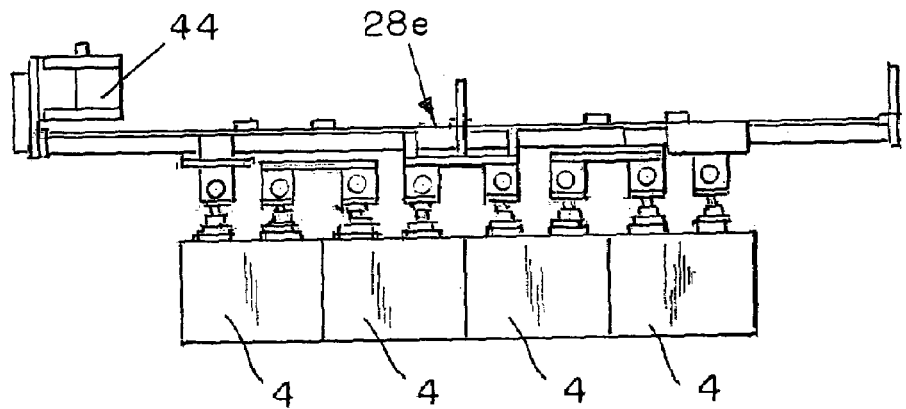
FIG. 10
FIG. 11
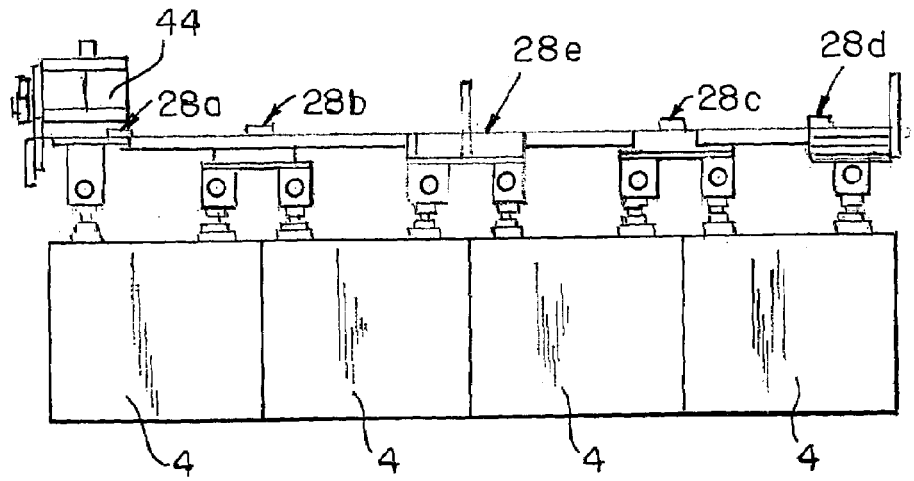

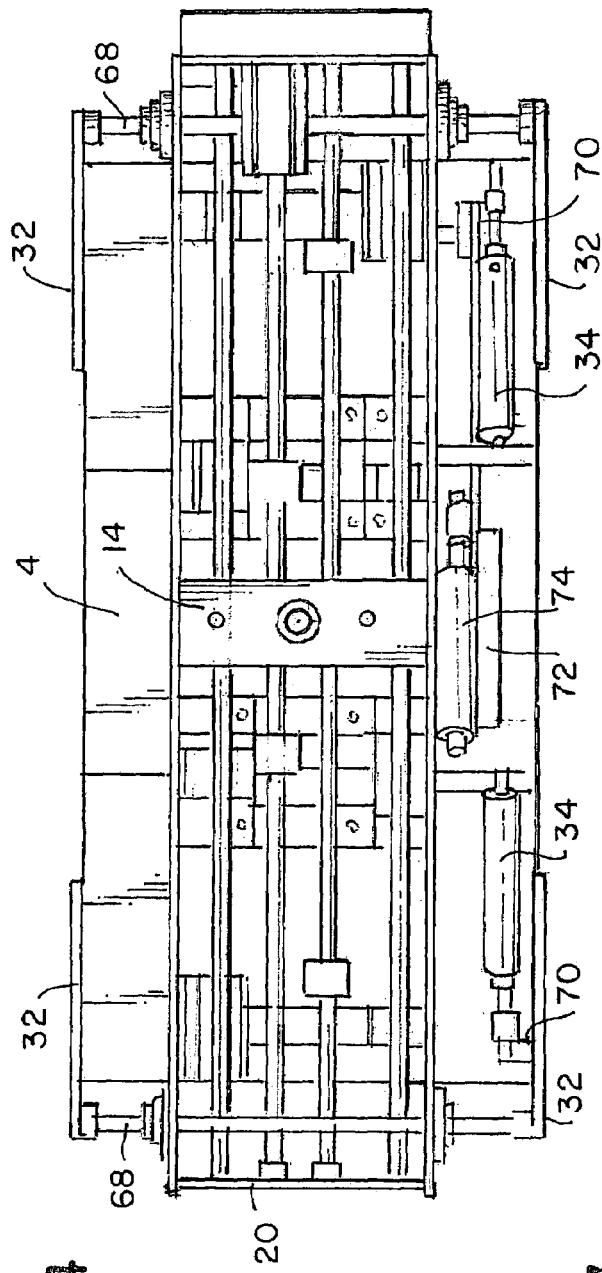
FIG. 14
FIG. 13
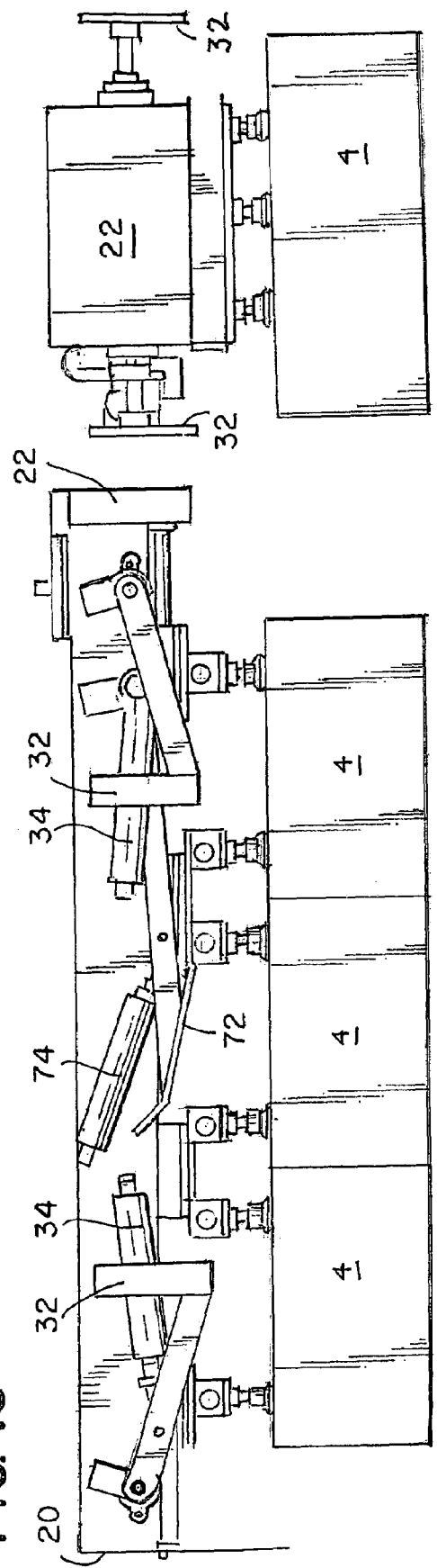
FIG. 15

SERVO ADJUSTABLE GRIPPER DEVICE

BACKGROUND OF THE INVENTION

In a manufacturing facility, items are packaged into boxes which are grouped in a linear configuration and positioned or aligned, such as on a conveyor with an end stop and reference clamp to pre-position the boxes. The aligned boxes are then lifted from the conveyor and placed onto pallets for shipment. Recent advances use fixed vacuum suction devices to lift the boxes from the conveyor and a robotic arm to transfer the vacuum suction devices and the associated boxes to a pallet.

The present invention was developed in order to provide an adjustable gripping assembly in which the gripping devices may be adjusted depending on the size and number of boxes to quickly and efficiently transfer aligned boxes to a pallet.

BRIEF DESCRIPTION OF THE PRIOR ART

Robotic transfer devices for removing articles from a conveyor are well-known in the prior art. In the de Koning U.S. Patent Publication No. 2003-0234157 A1, there is disclosed a robotic loading cell for molded utensils in which a mechanical gripper device is used to grip molded utensils from a conveyor and a robotic transfer mechanism is used to transfer the gripped utensils to a packaging assembly. Also known in the art are vacuum gripping assemblies which use suction to remove articles from a conveyor for packaging the articles. Such assemblies are disclosed in the de Koning et al U.S. Pat. No. 5,943,842.

While the prior devices operate satisfactorily for their intended use, there are no gripper assemblies capable of simultaneously transferring a plurality of different sized boxes or objects from a conveyor or other alignment device to a pallet for shipping. The present invention was developed to fill this void by providing a servo adjustable gripper device which can accommodate boxes or objects of different sizes and numbers to efficiently load the boxes on a pallet for shipping.

SUMMARY OF THE INVENTION

Accordingly, the present invention relates to a servo adjustable gripper device for transporting aligned boxes which includes an elongated frame having a plurality of carriages slidably connected therewith for longitudinal movement. A screw assembly is connected between the frame and the carriages and a servo motor is operated to turn the screw. Selective operation of the servo motor displaces the carriages along the frame to positions determined by the size and number of boxes to be transported. At least one gripping assembly is connected with each carriage. When the carriages are adjusted along the frame and the frame is positioned above the boxes, the gripping assemblies are actuated to simultaneously grip the boxes. The frame can then be moved to deposit the boxes on a pallet for shipping or to another location.

Preferably, the frame is moved by a robotic arm under control of a controller. The controller also controls the servo motor to position the carriages and to operate the gripping assemblies so that the entire transport process is automated.

The gripping assemblies comprise vacuum or mechanical grippers depending on the objects to be transported. Preferably, the assemblies comprise an array of grippers to provide more gripping force or to simultaneously transport more objects.

According to a preferred embodiment of the invention, the carriages at the opposite ends of the frame include a single set of gripping assemblies and the remaining carriages have two parallel sets of gripping assemblies. With this arrangement, a set of gripping assemblies can be positioned adjacent to the opposite edges of an object to be transported.

According to another object of the invention, the frame includes a plurality of pallet grasping arms which are operable by the controller to move a pallet to a desired location.

BRIEF DESCRIPTION OF THE FIGURES

Other objects and advantages of the invention will become apparent from a study of the following specification when viewed in the light of the accompanying drawings, in which:

FIG. 5 is a front detailed view of the carriage assemblies of the servo adjustable gripper device according to the invention;

FIG. 6 is a top detailed view of the drive mechanism for the carriage assemblies of FIG. 5;

FIG. 8 is a right side view of the carriage and drive mechanism of FIGS. 5 and 6;

FIG. 9 is a schematic view of the arrangement of carriages for simultaneously transporting three boxes of the same size and configuration;

FIG. 10 is a schematic view of an alternate arrangement of carriages for simultaneously transporting four boxes of the same size and configuration;

FIG. 11 is a schematic view of the arrangement of carriages of FIG. 10 used for simultaneously transporting four boxes of the same size and configuration but larger than the boxes of FIG. 10;

FIG. 13 is a front plan view of the gripper device of FIG. 12;

FIGS. 14 and 15 are top and right side plan views, respectively, of the gripper device of FIGS. 12 and 13; and FIG. 16 is a plan view of a mechanical gripper according to the invention.

DETAILED DESCRIPTION

Figure 1:
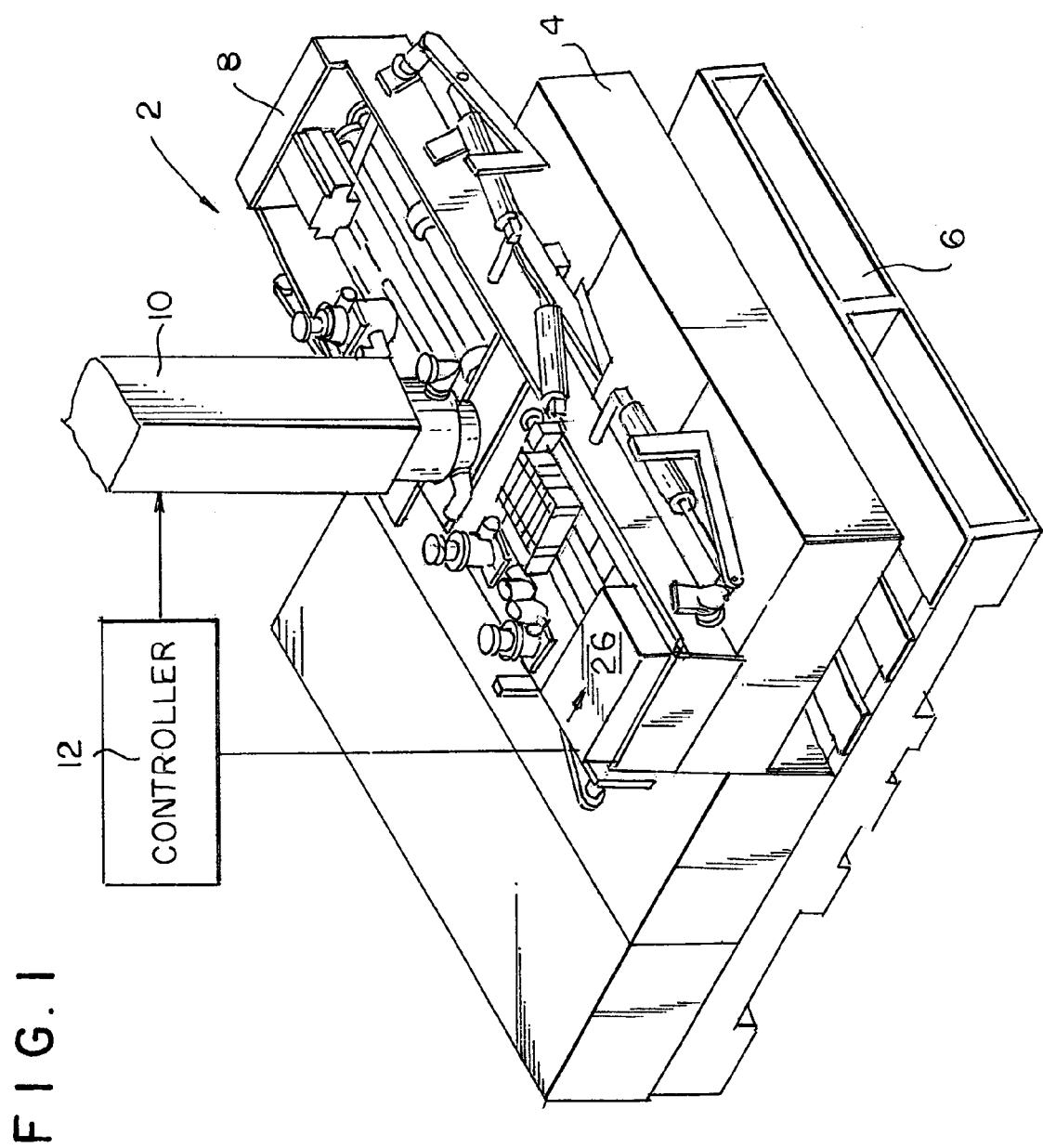
FIG. 1 is a perspective view of the servo adjustable gripper device according to the invention.

Referring to FIG. 1, the servo adjustable gripper device 2 according to the invention will be described. The device is used to grip a plurality of objects such as boxes 4 and deposit them onto a pallet 6 for shipment. The boxes originate from a conveyor or other device in which a plurality of boxes of packaged articles are aligned in end to end fashion and are transported by the gripper device for placement on the pallet. More particularly, the gripper device includes a frame 8 which is connected with a robotic arm 10 and a controller 12. The controller controls the movement of the arm and operation of the gripper device to simultaneously transport the boxes.

Figure 3:
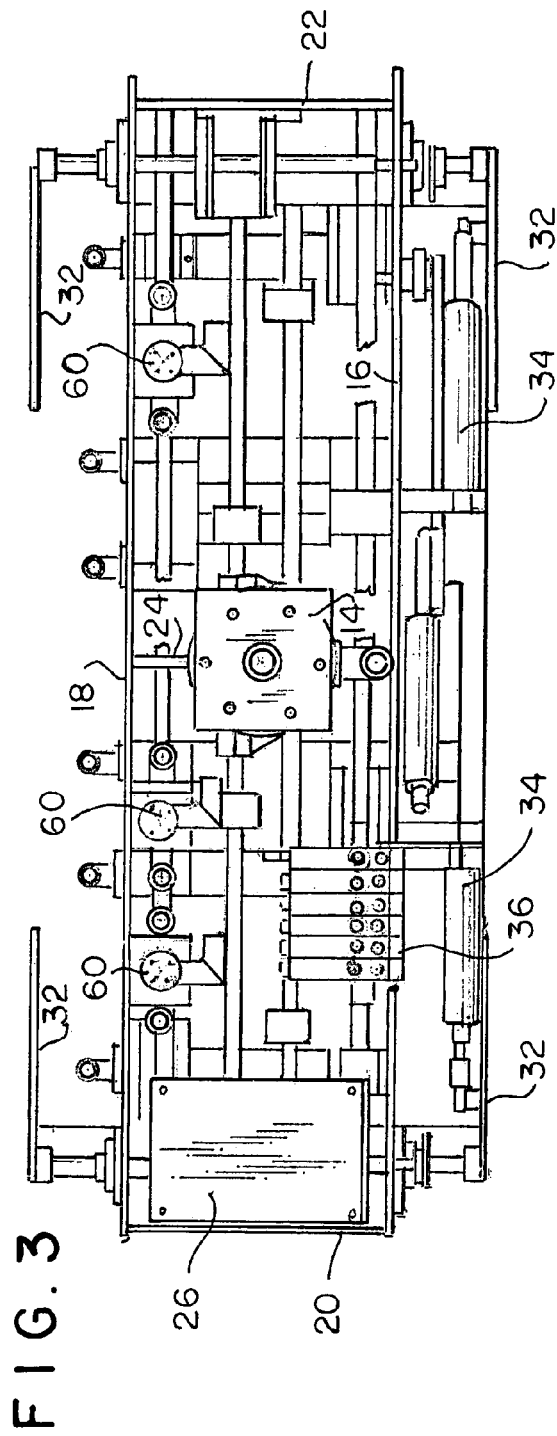
FIG. 3 is a top plan view of the gripper device of FIG. 2.
Figure 2:
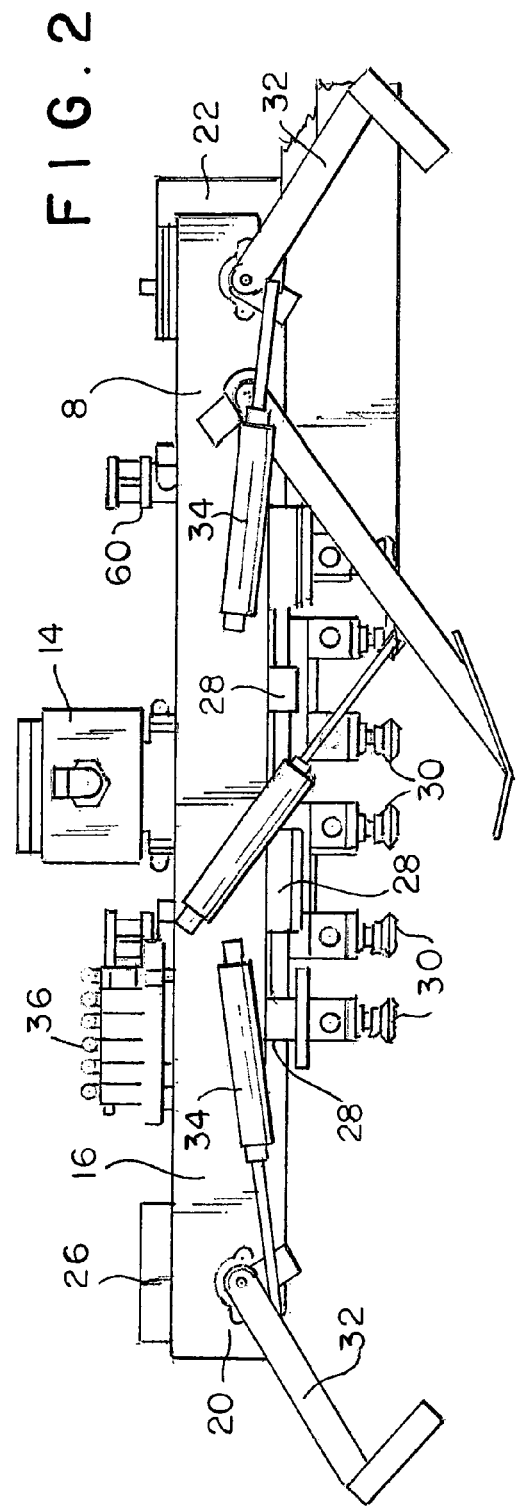
FIG. 2 is a front plan view of the gripper device according to a preferred embodiment of the invention.
Figure 4:
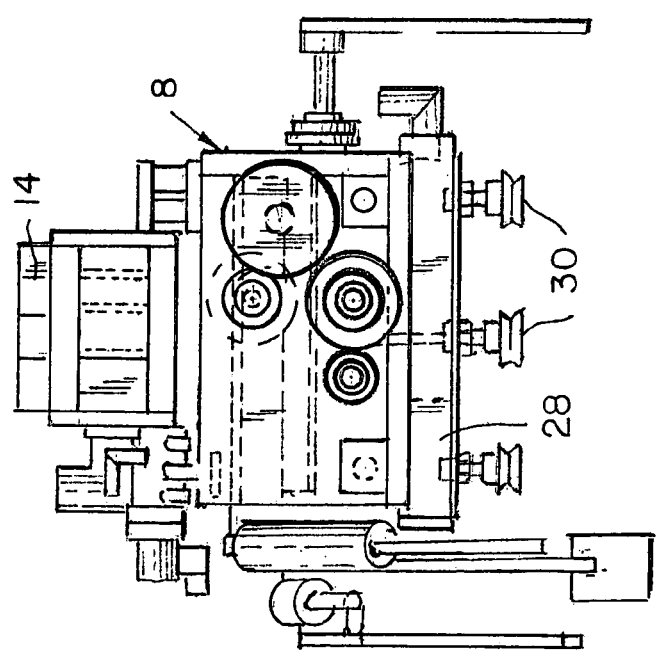
FIG. 4 is right side plan view of the gripper of FIG. 2.
Figure 12:
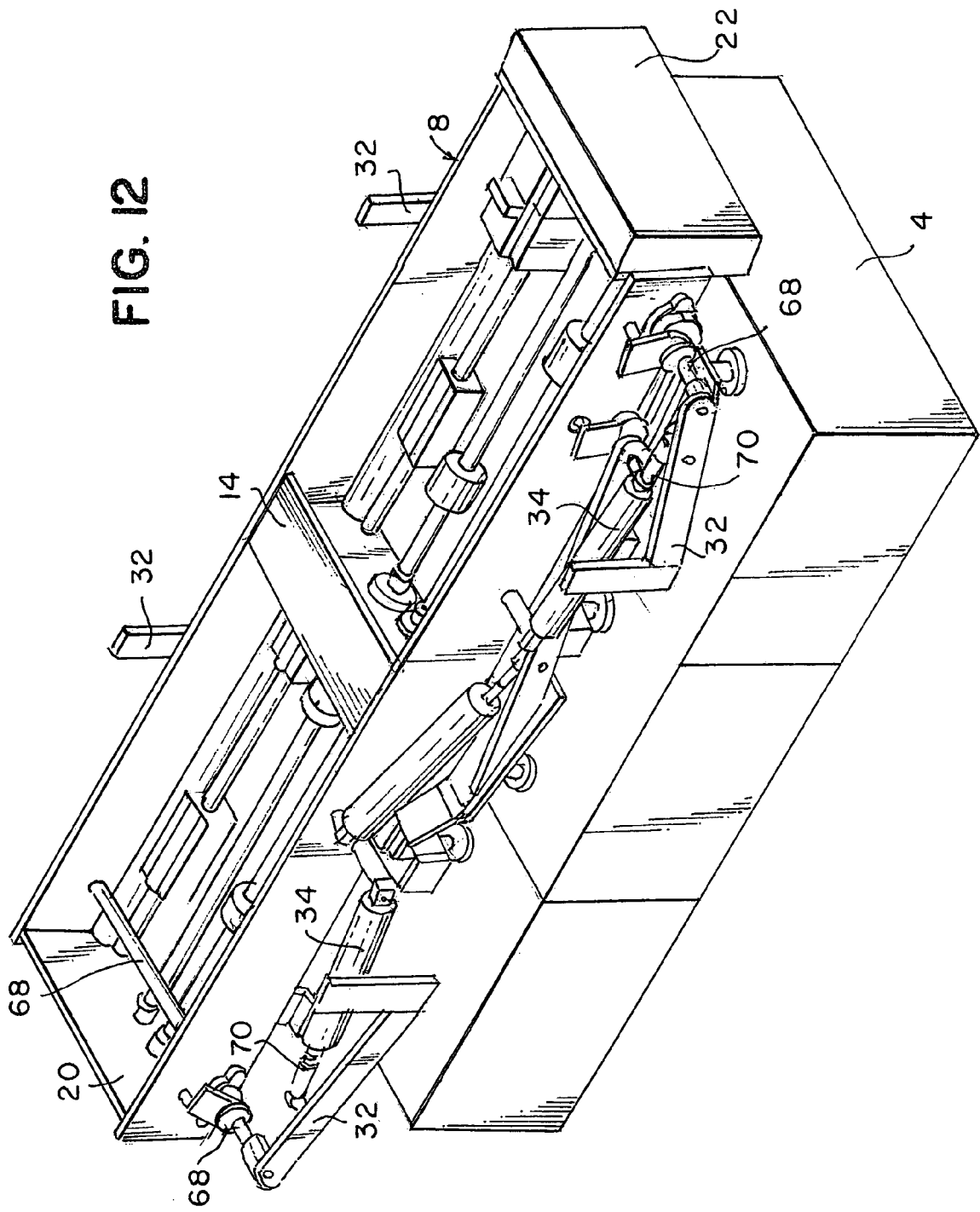
FIG. 12 is a partial perspective view of the servo adjustable gripper device showing the pallet grasping arms in detail.

The details of the servo adjustable gripper device according to the invention are better shown in FIGS. 2–4. At the top of the frame is a swivel device 14 which is connected with the end of the robotic arm so that the frame can be rotated relative to the arm. The frame has a generally rectangular configuration and includes a pair of side plates 16, 18, a pair of end plates 20, 22, and a center plate 24. A junction box 26 is arranged at one end of the frame and is electrically connected with the controller 12 for receiving control signals therefrom.

A plurality of carriages 28 are slidably connected with the frame as will be discussed in greater detail below in connection with FIGS. 5–8. The carriages have at least one gripping assembly 30 connected therewith. Also connected with the frame are pallet grasping arms 32 and pneumatic cylinders 34 for displacing the arms 32 under control of a pneumatic valve assembly 36 as will be described below with reference to FIGS. 12–15.

Figure 7:
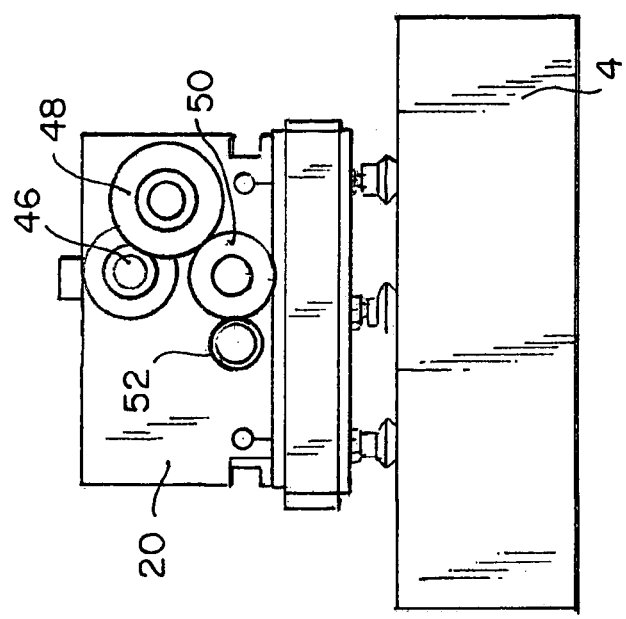
FIG. 7 is a left side view of the carriage and drive mechanism of FIGS. 5 and 6.

Referring now to FIGS. 5–8, the slidable carriages 28 and gripping assemblies 30 will be described. In the embodiment shown in these figures, there are four carriages 28a, 28b, 28c, and 28d. Connected between the frame end plates 20, 22 and passing through the center plate 24 of the frame are parallel guide rails 38 which support the carriages 28a–d. Between the guide rails 38 are provided two parallel lead screws 40 and 42 which are rotated by a servo motor 44 under control of the controller 12 via the junction box 26. Referring to FIG. 7, a drive gear 46 is rotated by the servo motor 44. An idler gear 48 transfers rotation of the drive gear to a first gear 50 which rotates the screw 40 and a second gear 52 which rotates the screw 42. The first and second gears have different diameters so that the first gear 50 rotates the screw 40 at a first speed and the second gear 52 rotates the screw 42 at a second speed which is twice the first speed. Substituting different sized gears will alter the rotational speed of the screws.

The first and second screws pass through couplings 54 in the frame center plate 24. The portions of the screws on opposite sides of the plate are threaded in opposite directions. That is, the left portion of the screw 40 is threaded in a first direction and the right portion of the screw on the opposite side of the center plate is threaded in an opposite direction. The same applies for the screw 42.

Each carriage includes a nut 56a, 56b, 56c, 56d which is threadably connected with one of the screws. More particularly, the nut 56a connects the carriage 28a with the left portion of the screw 42 and the nut 56d connects the carriage 28d with the right portion of the screw 42. The nut 56b connects the carriage 28b with the left portion of the screw 40 and the nut 56c connects the carriage 28c with the right portion of the screw 42. As the screw 40 rotates in a first direction, the carriages 28b and 28c are drawn together and when the screw rotates in the opposite direction, the carriages 28b and 28c are pushed away from each other. Similarly, as the screw 42 rotates in a first direction, the carriages 28a and 28d are drawn toward each other and when the screw rotates in the opposite direction, the carriages 28a and 28d are pushed away from each other. The carriages 28a and 28d move at twice the speed as the carriages 28c and 28d because of the different sizes of the drive gears 52 and 50.

Connected with each carriage 28 is at least one set of gripping assemblies including an array of gripping devices. In FIGS. 1–15, the gripping devices are vacuum devices 58 which utilize suction to grip the top surface of a box. The suction is provided by vacuum supplies 60 mounted on the frame. As shown in FIG. 8, three vacuum devices are provided in alignment for each set of gripping assemblies although any number of devices may provided. In lieu of vacuum devices, mechanical gripper devices may be provided where articles are to be transported instead of boxes. FIG. 16 shows a mechanical gripper device 62 which includes gripper fingers 64 which are displaced between gripping and released positions by a servo motor 66.

As shown in FIGS. 4 and 5, the carriages 28a and 28d at opposite ends of the frame 8 include a single set of gripping assemblies whereas the carriages 28b and 28c include two sets of gripping assemblies. This enables gripping assemblies to be positioned at the edges of the boxes. As shown in FIG. 5, the single set of gripping assemblies from the carriage 28a and one set of gripping assemblies from the carriage 28b are positioned at opposite edges of the left most box 4, the other set of gripping assemblies from the carriage 28b and one set from the carriage 28c are at opposite edges of the center box, and the other set of gripping assemblies from the carriage 28c and the single set of gripping assemblies from the carriage 28d are positioned at opposite edges of the right box. This arrangement is more clearly shown in FIG. 9.

FIGS. 10 and 11 show an alternate arrangement of carriages for transporting an even number of boxes. A center carriage 28e is provided which is fixed to the frame. Unlike the carriages 28a–d, the fixed center carriage 28e does not move along the frame. The fixed carriage includes two sets of gripping assemblies which are positioned at the edges of adjoining center boxes as shown. The remaining carriages are positioned as in the embodiment of FIGS. 5 and 9 so that gripping assemblies are provided at the opposite edge of each box to be transported.

In FIG. 11, the same servo adjustable gripper device as shown in FIG. 10 is provided, except that the device is being used to transport larger (wider) boxes than are being transported in FIG. 10. The larger boxes are accommodated by positioning the slidable carriages as necessary so that the gripping assemblies are arranged adjacent the end edges of the boxes.

With the present invention, all the operator of the servo adjustable gripper device must do is enter into the controller the number and dimension of the boxes to be transported. These entries are used by the controller to activate the servo motor 44 to turn the screws 40, 42 to properly position the carriages in accordance with the number and size of the boxes. If only two boxes are to be transported the outermost carriages 28a and 28d and the outermost gripping assemblies of the inner slidable carriages 28b and 28c would not be used. Thus, the adjustable gripper of the invention is extremely versatile and efficient for transporting boxes of articles from a loading conveyor to a pallet or other storage device. By entering the coordinates of the origin and destination into the controller, the robotic arm automatically transports the boxes as required. This allows a plurality of boxes to be efficiently transported simultaneously.

Turning now to FIGS. 12–15, the pallet grasping arm feature of the invention will be described. Four pallet grasping arms 32 are pivotally connected with the side walls of the frame 8, two arms per side. The arms on opposite sides of the frame are connected via rotatable shafts 68. Pneumatic cylinders 34 on one side of the frame have plungers 70 which are connected with intermediate portions of the arms 32. Operation of the cylinders by the pneumatic valve assembly 36 displaces the plungers to pivot the arms 32 up and down relative to the frame. Pivotal movement of the arms enables the end portions thereof to engage a pallet for transporting the same. A pallet stabilizer arm 72 is pivotally connected with the frame and pivoted by a pneumatic cylinder 74 under control of the pneumatic valve assembly 36 which is in turn operated by the controller. The stabilizer arm helps to steady the pallet during transport.

While the preferred forms and embodiments of the invention have been illustrated and described, it will be apparent to those of ordinary skill in the art that various changes and modifications may be made without deviating from the inventive concepts set forth above.

What is claimed is:

1. A servo adjustable gripper device for transporting aligned adjacent objects, comprising
   (a) an elongated frame;
   (b) a plurality of carriages connected with said frame, at least one of said carriages being slidably connected with said frame for longitudinal movement with respect thereto;
   (c) a displacement device connected with said frame for adjusting the position of said slidable carriages with respect to said frame; and
   (d) at least one gripping assembly connected with each of said carriages for gripping the objects, said carriages at the longitudinal ends of said frame having a single set of gripping assemblies with said remaining carriages having two parallel sets of gripping assemblies, whereby when said frame is positioned above the objects, said carriages are adjusted in accordance with the size and number of objects and said gripping assemblies are actuated to simultaneously grip a plurality of the objects.

2. A gripper device as defined in claim 1, wherein said displacement device comprises at least one screw connected with said frame, at least one of said slidable carriages having a nut threadably connected with said screw, whereby when said screw is rotated, said nut and carriage are displaced along said screw.

3. A gripper device as defined in claim 2, wherein said displacement device further comprises a servo motor for rotating said screw.

4. A gripper device as defined in claim 3, and further comprising a controller connected with said servo motor for displacing said screw to position said slidable carriage in accordance with the size and number of objects to be transported.

5. A gripper device as defined in claim 1, wherein said gripping assemblies comprise an array of vacuum grippers.

6. A gripper device as defined in claim 1, wherein said gripping assemblies comprise an array of mechanical grippers.

7. A servo adjustable gripper device for transporting aligned adjacent objects, comprising
   (a) an elongated frame;
   (b) a plurality of carriages connected with said frame, at least one of said carriages being slidably connected with said frame for longitudinal movement with respect thereto and including a nut;
   (c) at least one screw connected with said frame and threadably connected with said carriage nut, said screw being driven by a servo motor to displace said nut and carriage along said screw for adjusting the position of said slidable carriages with respect to said frame; and
   (d) at least one gripping assembly connected with each of said carriages for gripping the objects, said carriages at the longitudinal ends of said frame having a single set of gripping assemblies, with said remaining carriages having two parallel sets of gripping assemblies;
   (e) a controller connected with said servo motor for displacing said screw to position said slidable carriage in accordance with the size and number of objects to be transported, whereby a set of gripping assemblies can be positioned adjacent to two opposite edges of an object; and
   (f) a robotic arm connected with said frame and with said controller, said robotic arm being operable to position said frame adjacent to the objects for gripping the same and for moving said frame to transport the objects to another location where they are released by said gripping assemblies.

8. A gripper device as defined in claim 7, wherein a central carriage is immovably connected with said frame at a longitudinal center thereof.

9. A gripper device as defined in claim 1, and further comprising a plurality of pallet arms pivotally connected with said frame on opposition sides thereof.

10. A gripper device as defined in claim 9, and further comprising a plurality of actuators connected between each of said pallet arms and said frame, respectively, said actuators being connected with said controller and operable to pivot said arms to engage a pallet.

* * * * *